United States Patent [19]
Guichard et al.

[11] Patent Number: 4,979,038
[45] Date of Patent: Dec. 18, 1990

[54] VARIABLE THRESHOLD QUANTIFICATION PROCESS IN ENCODING BY TRANSFORMATION FOR THE TRANSMISSION OF IMAGE SIGNALS

[75] Inventors: Jacques Guichard, Paris; Géard Eude, Torcy, both of France

[73] Assignee: Etat Francais represente par le Ministere des Postes, des Telecommunications et de l'Espace (Centre National d'Etudes des Telecommunications), Organized under the Law of the French Republic, France

[21] Appl. No.: 408,294

[22] Filed: Sep. 18, 1989

[30] Foreign Application Priority Data

Sep. 19, 1988 [FR] France .................. 88 12186

[51] Int. Cl.$^5$ .............................. H04N 7/12
[52] U.S. Cl. ...................... 358/133; 358/135; 358/136
[58] Field of Search ............ 358/135, 136, 133, 105, 358/426; 341/200

[56] References Cited

U.S. PATENT DOCUMENTS

| | | | |
|---|---|---|---|
| 3,662,266 | 5/1972 | Limb et al. | 358/135 X |
| 3,984,626 | 10/1976 | Mounts et al. | 358/135 |
| 4,281,344 | 7/1981 | Mounts et al. | 358/136 |
| 4,845,560 | 7/1989 | Kondo et al. | 358/105 X |

FOREIGN PATENT DOCUMENTS

| | | |
|---|---|---|
| 0053064 | 6/1982 | European Pat. Off. . |
| 0239076 | 9/1987 | European Pat. Off. . |
| 0267578 | 5/1988 | European Pat. Off. . |
| 0267579 | 8/1988 | European Pat. Off. . |
| 3124550 | 12/1982 | Fed. Rep. of Germany . |
| 2597282 | 10/1987 | France . |

OTHER PUBLICATIONS

Frequenz, vol. 38, No. 10, Oct. 1984, pp. 247-254, Berlin, West Germany; V.A.-A. Vuong: "Entwurf eines blockweise adaptiven DPCM-Coders fur die M-Spektralwerte von Bilddaten", p. 250, paragraph 3.2: Der Quantisierer; it its entirety.

Onzieme Colloque Gretsi, Nice, Aug. 1–Jun. 5, 1987, theme 12: "Images", pp. 777-779; R. Philippe: Presentation d'un codec visiophone a 64 K bit/s, in its entirety.

Primary Examiner—Victor R. Kostak
Attorney, Agent, or Firm—Oblon, Spivak, McClelland, Maier & Neustadt

[57] ABSTRACT

The invention relates to a quantization process in an encoding by transformation for transmission on a low rate link of an image signal, said image signal being processed in the form of blocks, each containing a set of digital data, each block being transformed to produce a transformed block of coefficients (Ci) representing the frequency components of the block, each transformed coefficients of a block being quantified during a scan by comparison with quantization levels, the first being called the threshold, the process being characterized in that the quantization is performed with a threshold (T) able to vary between one transfored coefficient (Ci) and the next (Ci+1) in the scan, depending on whether the transformed coefficient does or does not fulfil the conditions $-T < Ci < +T$.

11 Claims, 2 Drawing Sheets

VARIABLE THRESHOLD QUANTIFICATION PROCESS IN ENCODING BY TRANSFORMATION FOR THE TRANSMISSION OF IMAGE SIGNALS

BACKGROUND OF THE INVENTION

The present invention relates to a quantization process in an encoding by transformation, particularly orthogonal, for the transmission of image signals. This process constitutes one of the stages of the real time treatment of a sequential information signal, such as a video signal, with a view to compressing the volume of data necessary for representing said signal in order to transmit it with a minimum bit rate, which can in particular be adapted to a 64 kbit/s transmission channel.

The process of the invention more particularly applies to the quantization of television, visioconference and picturephone images or pictures. It can also be used for slow variation images, such as in remote monitoring.

Numerous image encoding systems are known for the purpose of compressing an image signal in order to be able to transmit said image on a transmission line with a reduced bit rate. Reference can e.g. be made to EP-A2-84270, EP-A2-123456 and U.S. Pat. No. 4,196,148, which describe various image encoding systems.

In each encoding system, the image signal received is a digital bidimensional signal. This signal is encoded in four stages:

a transformation stage which, on the basis of the bidimensional signal describing an image in the spatial range, produces a bidimensional signal describing the image in a transformed range (also incorrectly called frequency range), a stage of quantifying the transformed bidimensional signal to reduce the number of levels of transformed coefficients of the transformed bidimensional signal, a stage of scanning or sweeping the transformed image to produce a monodimensional sequence of transformed coefficients, and optionally an encoding stage for encoding the sequence of transformed coefficients, the encoding process making use of a statistical code, e.g., of the Huffman code type.

In practice, the four encoding stages described hereinbefore do not directly apply to the overall image, because the transformation stage would be very complex and would require an exorbitant calculation time. Instead of processing or treating the image all at once, the image has to be broken down into several blocks, to each of which are successively applied the four aforementioned stages.

After transformation, these blocks are coded either in the intra-image, or the inter-image mode. In the first case, the untransformed block represents part of an image, whereas in the second the untransformed block represents a difference between two image portions, which are generally respective an image portion of an image raster and the same image portion of the preceding image raster. Only said image portion is encoded and transmitted.

In the case of inter-image mode encoding, it is optionally possible to have a prediction from the preceding image memory, which is coded, reconstructed and which undergoes filtering.

Each block has a size $N \times N$ of approximately $8 \times 8$ pixels, said size generally constituting a good compromise between the complexity of the transformation stage, which increases with the size of the blocks and the rate on the transmission line. In general terms, a block can be rectangular (size $N \times M$ pixels) and an image can be broken down into blocks not all having the same size.

The transformation operation applied to each block can be a discrete cosine transformation, a Fourier transformation, a Hadamard transformation, a Haar transformation, a highly correlated transformation, etc. The coefficients of the transformed block are generally called frequency coefficients or sequential coefficients for the Hadamard transformation, the coefficients of the transformation block not exactly representing the frequency components of the image corresponding to the untransformed block. However, the term frequency range is incorrectly used for the transformed block range.

In a transformed block of size $N \times M$, in which the coefficients have row indexes between 0 and $N-1$ and column indexes between 0 $N-1$, the coefficient of coordinates (0,0) represents the continuous component and the other coefficients the alternating components, the low frequency components corresponding to the low index coefficients and the high frequency components to the high index coefficients.

It is known that the continuous component generally has a high value and on average the value of the alternating components decreases on passing from low to high frequencies.

The quantization of the values of the transformed coefficients brings about a first compression of the block. For this quantification, quantization levels are defined (also called decision levels), which are regularly or irregularly distributed in the range $[-B,B]$, in which B is the maximum possible amplitude for a transformed coefficient.

Thus, quantization consists of defining a measuring scale constituted by several levels spaced by the quantization step G, the first being called the quantization threshold. Each coefficient is compared with this quantization threshold.

In more general terms, a comparison takes place between each scanned coefficient and the interval defined by $]+G, -G[$.

The coefficients in the interval are coded by a zero.

The coefficients outside the interval are compared with multiples of $+G$ and $-G$, said multiples defining the different levels, the coefficients then being encoded as a function of these levels. For example, when a coefficient is between 3G and 4G, its encoding will correspond to an amplitude 4.

As certain blocks contain more or less informations linked with movements, there is a regulation between the information quantity to be transmitted of one block of an image with respect to a block of the following image. For this purpose there is a suppression of the low frequency coefficients in the blocks corresponding to many movements in the image. With the same aim, it is also possible to modify the quantization step G from one block of an image to a block of the following image and e.g. choose a low step G for blocks without movement and a high step G for blocks with significant movements.

All the aforementioned known treatments are described in the aforementioned patent applications and also in the article entitled "L'image numerique et le codage", 4th quarter 1986, No. 126 Echo des Recherches and relate to significant compression of an image signal, whilst maintaining an appropriate image quality.

However, with the aim of compressing the information quantity to be transmitted in order to reduce the flow rate and carry out a low rate transmission, as performed in the digital telephone network at 64 kbit/s, the Applicant has not merely observed the presence or absence of movement from one image to the next and therefore from one block to the next, as has been done in the prior art.

The Applicant has unexpectedly had the idea of acting on the quantization step G within the actual coefficient block, in order to modify the threshold between the different coefficients of the same block. The Applicant found on the basis of tests and a practical realization that the variation of the quantization step within the block makes it possible to further compress the information to be transmitted without leading to any deterioration in the transmitted image quality.

The present invention therefore relates to a threshold quantization process in encoding by transformation for the transmission of image signals consisting of varying the quantization threshold within the scanned coefficient block.

SUMMARY OF THE INVENTION

The present invention specifically relates to a quantization process in an encoding by transformation for the transmission on a low rate link of an image signal, the latter being treated in the form of blocks, each containing a set of digital data organized in matrix form and representing part of an image or a difference between two image parts, each block being transformed by a transformation operator to produce a transformed block of transformed coefficients $C_i$ organized in matrix form and representing the frequency components of said image part or said difference between two image parts, said quantization process being applied to each transformed block, each transformed coefficient of a transformed block being quantized, at the end of a scan of the block, by comparison with quantization levels, the process being characterized in that the quantization is performed with a quantization step G and a threshold T liable to vary between one transformed coefficient $C_i$ and the next $C_{i+1}$ in the scan, depending on whether the transformed coefficient $C_i$ is higher, lower or equal to said quantization step.

According to another feature of the invention, for one block of a given image a first threshold is chosen equal to the quantization step (T=G), two first quantization thresholds are defined by the interval $]-G, +G[$, the block is scanned, a comparison takes place on each coefficient $C_i$ to establish whether said coefficient fulfils the following conditions (III): $-T < C_i < T$, the same threshold T=G is retained for the following coefficient $C_{i+1}$ in the case where the coefficient $C_i$ does not fulfil this condition, a code $K_i$ being transmitted on the transmission link in place of $C_i$, the threshold T ($T=T+a$) is incremented for the following coefficient $C_{i+1}$ in the case where the coefficient $C_i$ fulfils the condition (III), a code $K_i=0$ being transmitted on the transmission link in place of $C_i$.

According to another feature of the invention, during successive incrementations of the threshold T, a comparison takes place with respect to a predetermined maximum threshold Tmax.

According to a feature of the invention $Tmax = G + ki$, in which i is the frequency index of the block scan.

Advantageously, a maximum step Tmax equal to $G + G/2$ is chosen for a 64 kbit/s picturephone application.

Advantageously, a code $K_i$ is chosen for encoding a coefficient $C_i$, such that $C_i$ is equal to or greater than $(K_i-1).G$ and equal to or below $K_i.G$.

According to another feature of the invention, a double scan is performed consisting of scanning the coefficients in two opposite directions, one starting from the first coefficient $C_o$ corresponding to the continuous component of the block and passing to the final coefficient $C_p$ corresponding to the high frequency component of said block and the other passing from the last coefficient $C_p$ to the first coefficient $C_o$.

The scan performed can either be horizontal (from row to row), or vertical (from column to column), or diagonal, or any other form.

According to another aspect of the invention, the first threshold equal to the chosen quantization step (T=G) for one block of a given image can be modified from one image to the other, from one block group to the other, or from one block to the other.

Throughout the remainder of the description, for simplification reasons the transformed coefficients of a block having undergone an orthogonal transformation are designated by a single index i and not in accordance with a conventional matrix making corresponding to their position in the block. Thus, for simplification purposes, each coefficient has been designated by the index i corresponding to the order in which each coefficient is scanned, whereby these coefficients are then transmitted in series in this order.

BRIEF DESCRIPTION OF THE DRAWINGS

The invention is described in greater detail hereinafter relative to non-limitative embodiments and with reference to the attached drawings, wherein show.

DETAILED DESCRIPTION OF THE DRAWINGS

The process according to the invention is applied to image blocks scanned by any scan type, namely horizontal, vertical, diagonal, or of another type, e.g. Peano, as described in the aforementioned article appearing in Echo des Recherches, 1986.

A block has a matrix of coefficients transformed by an orthogonal transformation. These coefficients are designated by a series $\{C_i, i=1, \text{to } p\}$ corresponding to the order in which scanning took place. According to the process, the threshold used is varied for quantizing each coefficient of a block.

(1) For a given block, a first threshold T is fixed equal to the quantization step G conventionally predetermined as a function of the magnitude of the movements of the image part represented by said block or any other process devolving from the regulation method.

(2) The size of the block and therefore the maximum coefficient i is designated, imax=p, currently 64.

Figure 1:
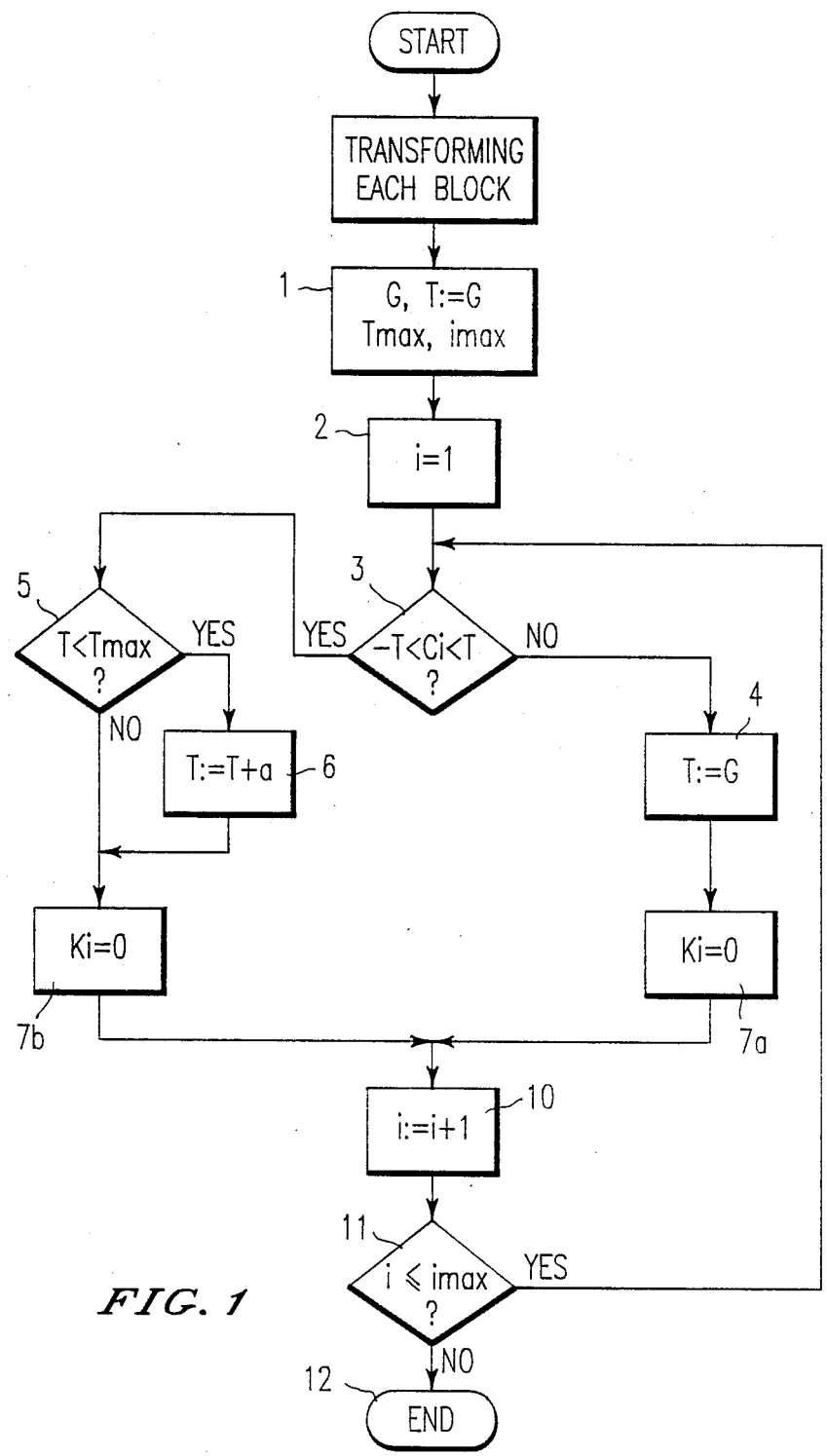
FIG. 1 different stages of the process in the form of a flow chart according to the invention.

(3) Preferably also a maximum threshold Tmax is fixed chosen in form $G + ki$ and chosen as an example equal to $G + G/2$. These first three stages correspond to the block I in FIG. 1.

(4) The block is scanned and revealed on the flow chart by a successive incrementation (block X) of the index i of the coefficients with i=1 for the first coefficients (block II, FIG. 1) and a comparison of said index i with imax (block XI) representing the end of the treatment of the block when said value is reached (block XII).

(5) A comparison takes place on each coefficient Ci to establish whether this coefficient fulfils the following condition III:

$$-T < Ci < +T \text{ (block III, FIG. 1)}$$

(6) In the case where said condition is not fulfilled, the same threshold T is retained equal to the quantization step G (i.e. T=G, block IV) for treating the following coefficient Ci+1 and the current coefficient Ci is encoded, said coding consisting of replacing the amplitude of the coefficient by a compressed amplitude Ki (block VIIa).

(7) In the case where condition III is fulfilled, there is an incrementation of the threshold T, i.e. consisting of taking as the new threshold for the treatment of the coefficient Ci+1, a threshold T+a (block VI). The current coefficient fulfilling said addition is encoded by a code Ki=0, the amplitude of said coefficient consequently being replaced by a zero amplitude (block VIIb).

(8) If a maximum threshold Tmax is fixed, a comparison takes place between the current threshold T and said maximum threshold Tmax (block VI).

If T fulfils the condition T<Tmax, incrementation takes place (block VI). If T does not fulfil the condition, a threshold is retained which is equal to the quantization step T=G for the following coefficient Ci+1. The increment a is a positive number e.g. taken as equal to 1.

Figure 2:
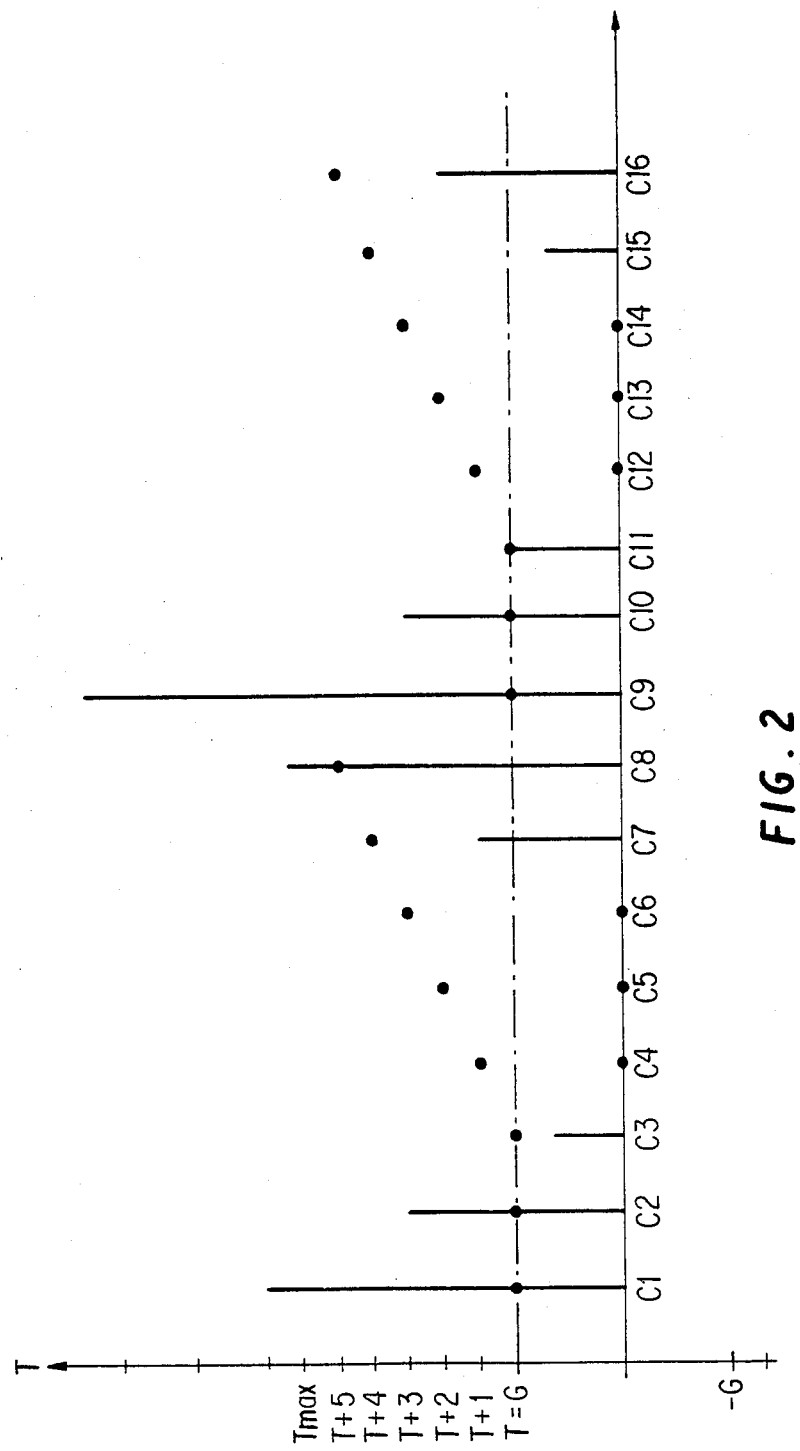
FIG. 2 a graph representing the amplitudes of a series of transformed coefficients with the variations of the corresponding quantization step.

FIG. 2. shows in exemplified manner a graph representing the amplitude of 16 coefficients C1–C16 of a block with for each of them the evolution of the threshold T according to the invention.

Threshold T is incremented by 1 from coefficient C4, because coefficient C3 fulfils the relation III, because its amplitude is in the interval ]−G,+G[.

Threshold T is incremented up to coefficient C8. This threshold passes to T32 G again for coefficient C9, because coefficient C8 no longer fulfils condition III. Threshold T remains at T=G until a new coefficient fulfils condition III. Advantageously a code Ki is chosen for encoding a coefficient Ci, so that the following relation is obtained:

$$(Ki-1)G \leq Ci \leq Ki.G$$

According to another feature of the process according to the invention, a double scan of the treated block takes place, in two opposite directions in order to symmetrize the treatment. At the end of this double scan, transmission only takes place of codes Ki which are not zero for the coefficients not fulfilling the condition III during the two scans and zero codes Ki for the coefficients fulfilling the condition III during the two scans, or which fulfil the condition III during one of the two scans. At this instant, there is a logic OR function between the results of the two scans. During the first scan, one starts from the coefficient Co and passes to the coefficient Cp, whilst during the second scan one starts from the coefficient Cp and passes to the coefficient Co.

As in the prior art, it is possible without modifying the process according to the invention, to modify the quantization step G between one image and the next, between one block and the next and between one block group and the next.

The values of G and Tmax are not necessarily constants, but can also be a function of the frequency index of the scan and also the filling rate of the buffer store containing the stored block in the case of Tmax.

The invention is also applicable to any process in which, after transformation or not, a plurality of points or blocks is thresholded after e.g. Peano scanning prior to transmission.

The process according to the invention can be realized with the aid of a per se known cabled logic placed at the output of the operator performing the orthogonal transformation and e.g. having threshold comparators, an incrementation counter and logic gates and able to carry out comparison and incrementation stages of the flow chart step T. The code can be realized by a conventional quantization circuit placed at the output of the cabled logic.

The process can be performed by any specialized processor programmed for this purpose, such as a transputer programmed in OCCAM language, or an assembler-program TMS320-25 circuit.

An example of a program in structured language is given hereinafter in exemplified manner and can be used for realizing the process in the specialized circuits described hereinbefore:

```
i = 1
T: = G
Tmax : = G +G/2
if i≦imax
    if T<Ci< +T then
        if T<Tmax then
            T : = T+1
        end if
        Ki : = 0
    if not
        T : = G
        Ki : = Ci
    end if
    I : = I+1
End.
```

We claim:

1. A quantization process for encoding by transformation the transmission on a low rate link of an image signal, the latter being treated ion the form of blocks, each containing a set of digital data organized in matrix form and representing part of an image or a difference between two image parts, comprising the steps of:
   transforming each block by a transformation operator to produce a transformed block of transformed coefficients ($C_{1-N}$) organized in matrix form and representing the frequency components of said image part or said different between two image parts;
   applying said quantization process to each transformed block;
   performing a comparison of each transformed coefficient of a transformed block being quantized, at the end of a scan of the block with quantization levels; and
   wherein the quantization is performed with a quantization step G and a threshold T liable to vary between one transformed coefficient (Ci) and the next coefficient (Ci+1) in the scan, depending on whether the transformed coefficient Ci is higher, lower or equal to said quantization step.

2. A quantization process according to claim 1 further comprising:

selecting for one block of a given image a first threshold equal to the quantization step ($T = G$);

defining two first quantization thresholds by the interval $]-G, +G[$;

performing a comparison on each coefficient $C_{1-N}$ to establish whether said coefficient fulfils the following condition (III): $-T < C_i < T$, the same threshold $T = G$ is retained for the following coefficient $C_{i+1}$ in the case where the coefficient $C_i$ does not fulfil this condition, a code $K_i$ being transmitted on the transmission link in place of $C_I$, the threshold $T$ ($T = T + a$) is incremented for the following coefficient $C_{i+1}$ in the case where the coefficient $C_i$ fulfills the condition (III), a code $K_i = 0$ being transmitted on the transmission link in place of $C_i$.

3. A quantization process according to claims 1 or 2, further comprising:

incrementing successively the threshold T; and performing a comparison with a predetermined maximum threshold Tmax.

4. A quantization process according to claim 3, further comprising:

selecting a maximum threshold Tmax of the form $G + k_i$.

5. A quantization process according to claim 4, further comprising:

selecting a non-zero code $K_i$ for encoding a coefficient $C_i$ such that:

$$G.(K_i+1) \leq C_i \leq G.K_i$$

6. A quantization process according to claim 5, further comprising:

performing a double scan consisting of scanning the coefficients in two opposite directions, one passing from a first coefficient Co to a final coefficient Cp and the other from the final coefficient to the first coefficient.

7. A quantization process according to claim 6, further comprising:

performing a diagonal scan.

8. A quantization process according to claim 6, further comprising:

performing a horizontal scan.

9. A quantization process according to claim 6 further comprising:

performing a vertical scan.

10. A quantization process according to claim 6, characterized in that the blocks are thresholded and encoded following a Peano scan.

11. A quantization process according to claim 10, characterized in that the quantization step chosen for a block can be modified between one image and the other, between one block group and the other and one block and the other.

* * * * *

UNITED STATES PATENT AND TRADEMARK OFFICE
CERTIFICATE OF CORRECTION

PATENT NO. : 4,979,038

DATED : December 18, 1990

INVENTOR(S) : Jacques Guichard et al.

It is certified that error appears in the above-identified patent and that said Letters Patent is hereby corrected as shown below:

ON TITLE PAGE:

The title is incorrect, should be --VARIABLE THRESHOLD QUANTIZATION PROCESS IN ENCODING BY TRANSFORMATION FOR THE TRANSMISSION OF IMAGE SIGNALS--.

Signed and Sealed this

First Day of September, 1992

Attest:

DOUGLAS B. COMER

*Attesting Officer*   Acting Commissioner of Patents and Trademarks